(12) United States Patent
Sandoval

(10) Patent No.: US 12,404,963 B2
(45) Date of Patent: Sep. 2, 2025

(54) WATER PIPE WINTERIZING ASSEMBLY

(71) Applicant: Ruben Sandoval, Grants, NM (US)

(72) Inventor: Ruben Sandoval, Grants, NM (US)

( * ) Notice: Subject to any disclaimer, the term of this patent is extended or adjusted under 35 U.S.C. 154(b) by 628 days.

(21) Appl. No.: 17/902,538

(22) Filed: Sep. 2, 2022

(65) Prior Publication Data

US 2024/0077161 A1 Mar. 7, 2024

(51) Int. Cl.
| | |
|---|---|
| *F16L 53/38* | (2018.01) |
| *F16L 59/22* | (2006.01) |
| *H05B 1/02* | (2006.01) |
| *H05B 3/56* | (2006.01) |

(52) U.S. Cl.
CPC .............. *F16L 53/38* (2018.01); *F16L 59/22* (2013.01); *H05B 1/0252* (2013.01); *H05B 3/56* (2013.01)

(58) Field of Classification Search
None
See application file for complete search history.

(56) References Cited

U.S. PATENT DOCUMENTS

| | | | |
|---|---|---|---|
| 3,331,946 A | 7/1967 | Bilbro | |
| 4,429,213 A | 1/1984 | Mathieu | |
| 4,456,027 A * | 6/1984 | Belgard | F16K 27/12 24/301 |
| 5,413,134 A * | 5/1995 | Burgess | A01G 25/00 251/293 |
| 5,614,119 A * | 3/1997 | Ollis | F16K 27/12 392/416 |
| 6,536,458 B1 * | 3/2003 | Kindermann | F16K 49/002 137/59 |
| 10,935,254 B2 * | 3/2021 | Toomey | E03B 7/12 |
| 2005/0126630 A1 * | 6/2005 | Swan | E03B 7/12 137/80 |
| 2011/0137826 A1 * | 6/2011 | West | G06Q 30/04 705/412 |
| 2020/0293072 A1 * | 9/2020 | Ly | F16L 41/023 |
| 2022/0333361 A1 * | 10/2022 | Tieszen | E03B 7/12 |

FOREIGN PATENT DOCUMENTS

| | | | | |
|---|---|---|---|---|
| CA | 5082151 | | 4/1994 | |
| DE | 102011102148 A1 * | | 11/2012 | .............. F16L 53/30 |
| EP | 2210034 | | 10/2007 | |
| EP | 2649357 | | 10/2011 | |
| KR | 20240013530 A * | | 1/2024 | .............. H05B 3/56 |

* cited by examiner

Primary Examiner — Woody A Lee, Jr.

(57) ABSTRACT

A water pipe winterizing assembly includes a pipe has a female hose coupling for engaging a hose bib on a building. A heating unit is attached to the pipe and the heating unit heats the pipe when the heating unit is turned on to inhibit the hose bib and associated water pipes from freezing. An insulating pad is positioned around the pipe and the insulating pad is comprised of a thermally insulating material thereby inhibiting thermal communication between the pipe and ambient air. A cover is positionable over the hose bib and the pipe extends through the cover. A retainer extends through the cover and the retainer is positionable around the hose bib when the cover is positioned over the hose bib for retaining the cover over the hose bib.

10 Claims, 9 Drawing Sheets

WATER PIPE WINTERIZING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to winterizing devices and more particularly pertains to a new winterizing device for inhibiting a hose bib and associated water pipes from freezing. The device includes a pipe that has a female hose coupler to facilitate the pipe to be attached to a hose bib. The device includes a heating unit that is attached to the pipe and which heats the pipe to inhibit the hose bib and associated water pipes from freezing. The device includes a cover that is positionable over the hose bib and the pipe extends through the cover. The device includes a retainer that is integrated into the cover and the retainer engages the hose bib to retain the cover over the hose bib.

(2) Description of Related Art Including Information Disclosed Under 37 CFR 1.97 and 1.98

The prior art relates to winterizing devices including a heated hose for transferring liquids that are temperature sensitive. The prior art discloses a heating device that is placed around a metal pipe for retaining the metal pipe at a pre-determined temperature. The prior art discloses an electric pipe heater that includes a channel that is mounted to an outer wall of a pipe and a heating element that is positioned in the channel to heat the pipe. The prior art discloses a pipe heater that includes a heating sleeve that encloses a pipe for heating the pipe and an insulating shell that includes a first half which engages a second half for enclosing the heating sleeve.

BRIEF SUMMARY OF THE INVENTION

An embodiment of the disclosure meets the needs presented above by generally comprising a pipe has a female hose coupling for engaging a hose bib on a building. A heating unit is attached to the pipe and the heating unit heats the pipe when the heating unit is turned on to inhibit the hose bib and associated water pipes from freezing. An insulating pad is positioned around the pipe and the insulating pad is comprised of a thermally insulating material thereby inhibiting thermal communication between the pipe and ambient air. A cover is positionable over the hose bib and the pipe extends through the cover. A retainer extends through the cover and the retainer is positionable around the hose bib when the cover is positioned over the hose bib for retaining the cover over the hose bib.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
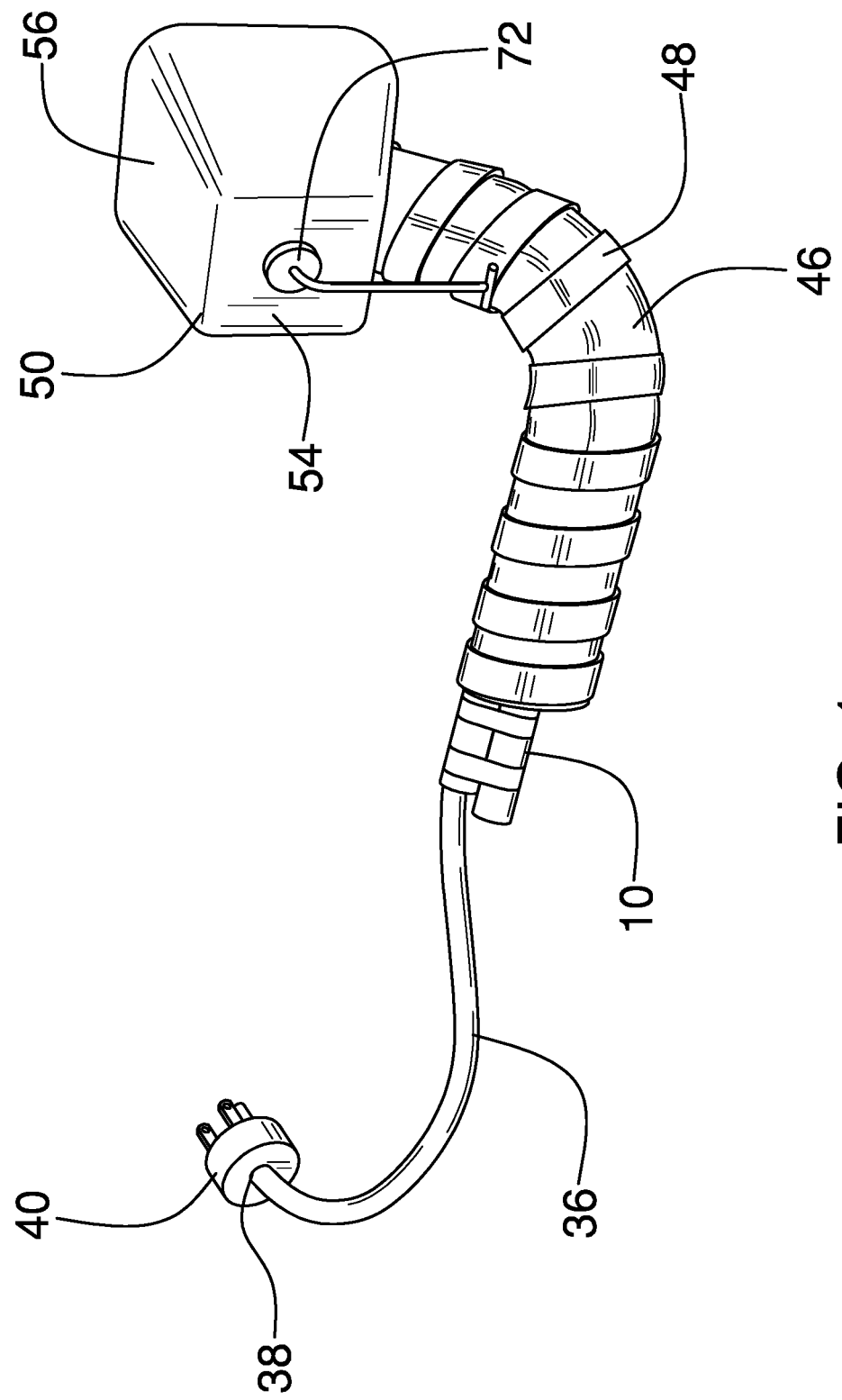
FIG. 1 is a perspective view of a water pipe winterizing assembly according to an embodiment of the disclosure.
Figure 2:
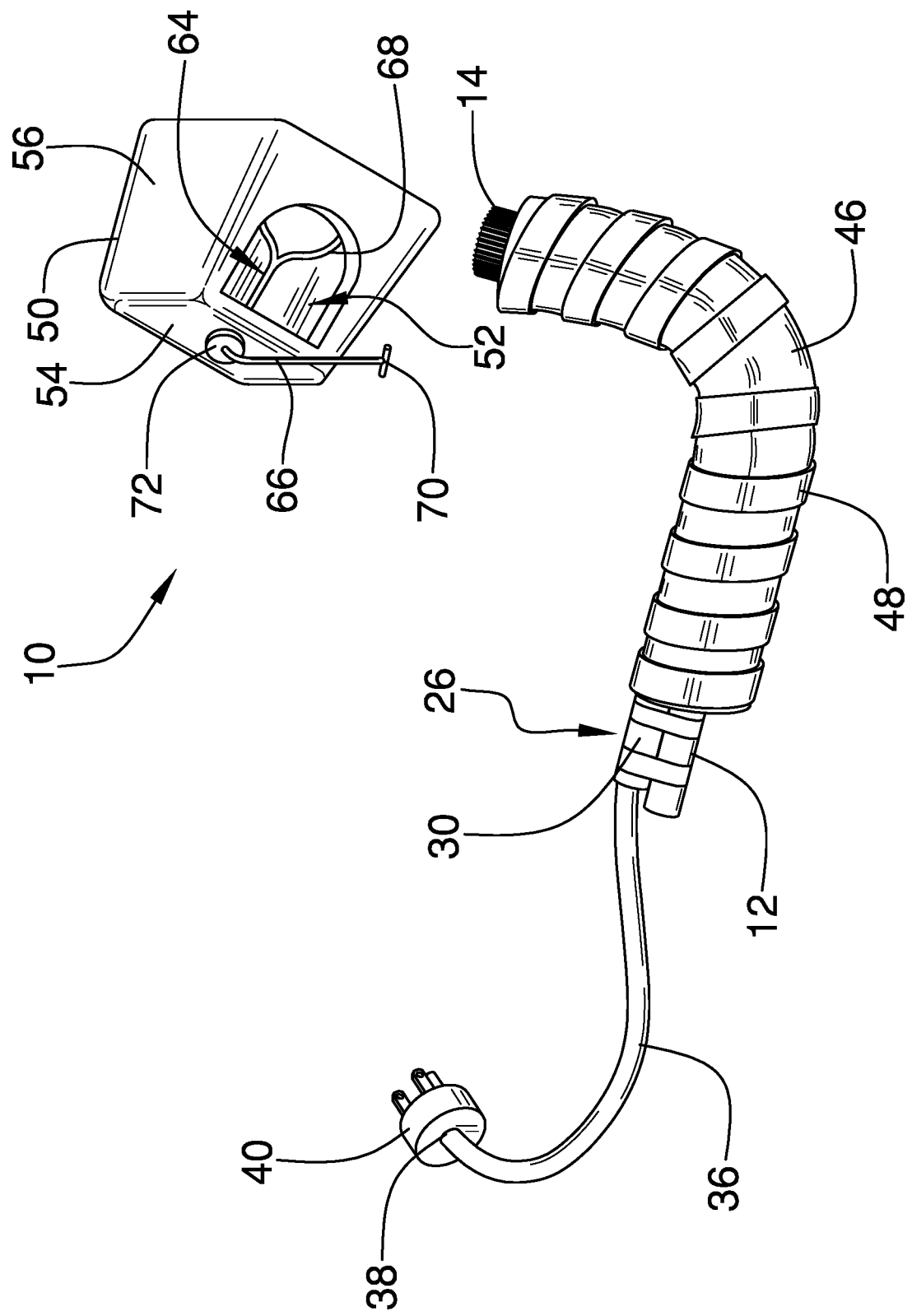
FIG. 2 is an exploded perspective view of an embodiment of the disclosure.
Figure 3:
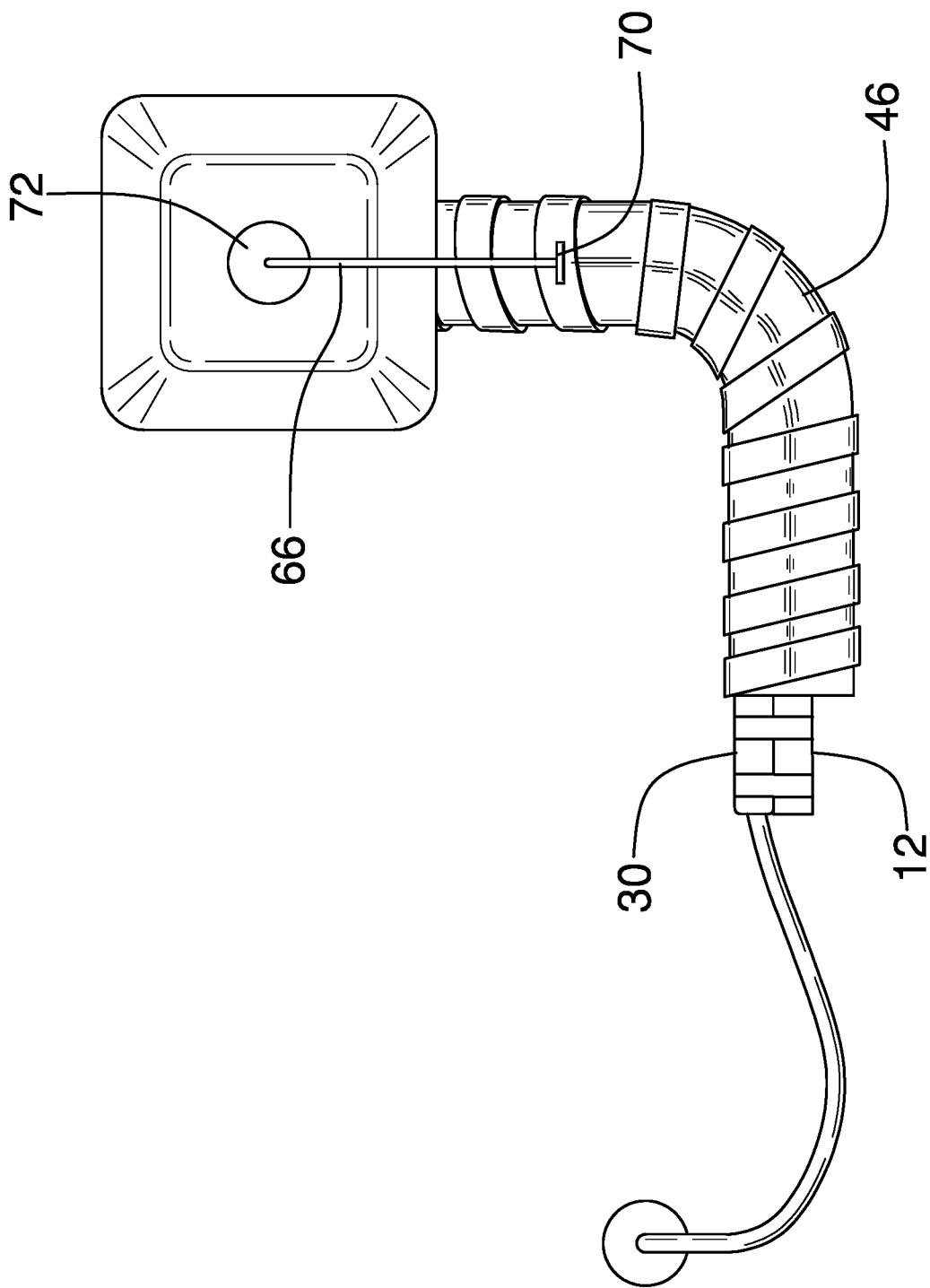
FIG. 3 is a back view of an embodiment of the disclosure.
Figure 4:
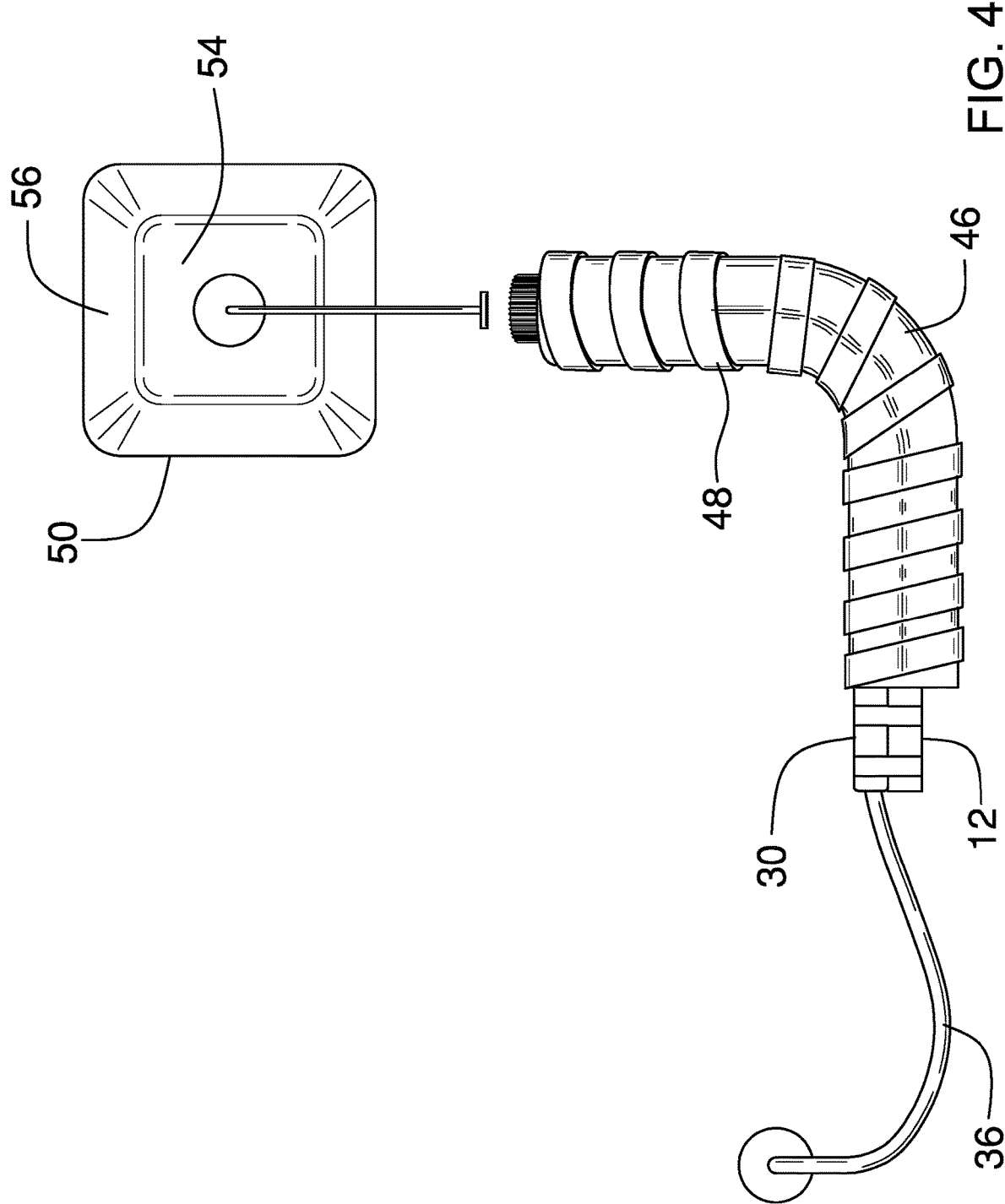
FIG. 4 is an exploded back view of an embodiment of the disclosure.
Figure 5:
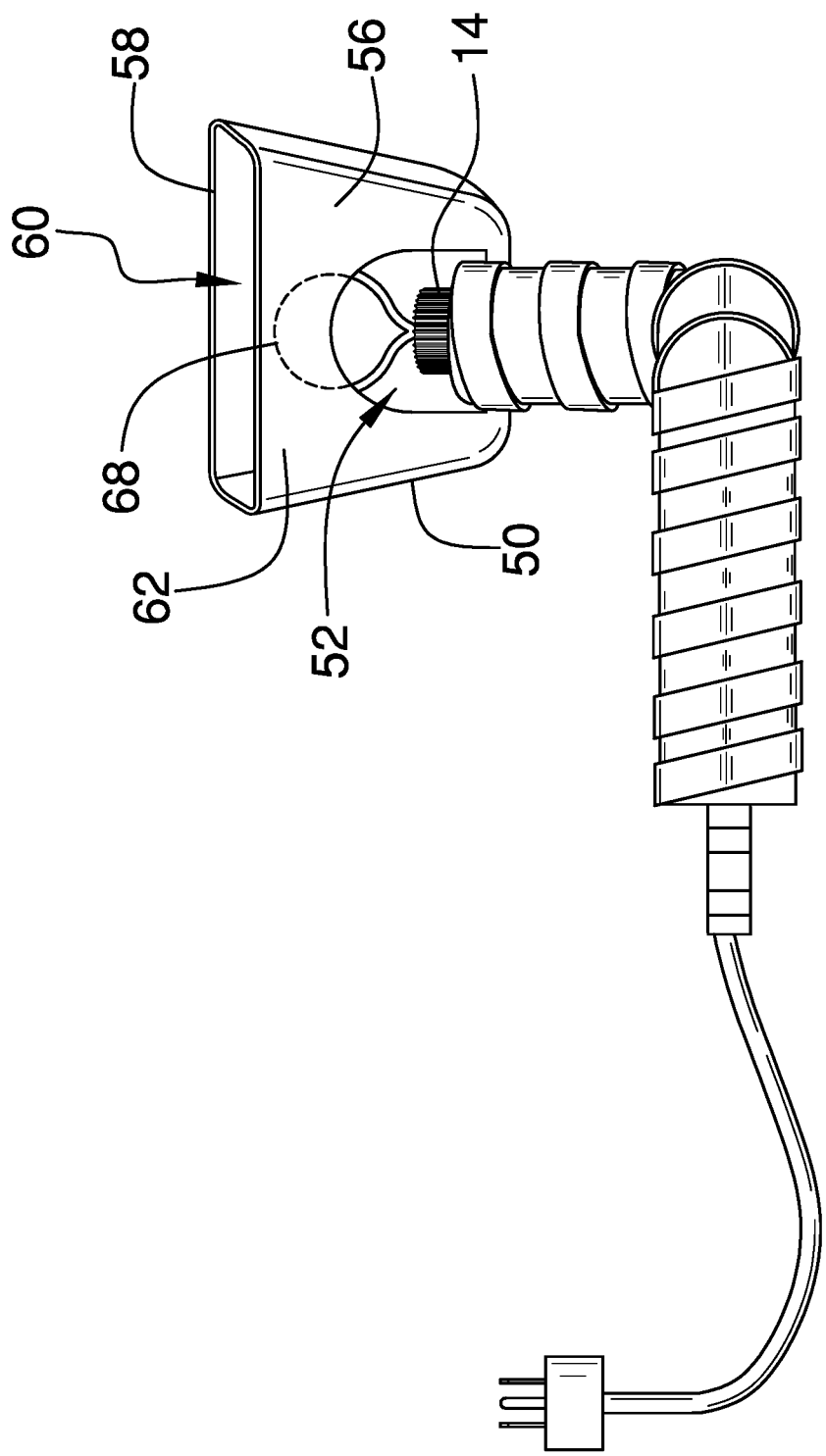
FIG. 5 is a bottom view of an embodiment of the disclosure.
Figure 6:
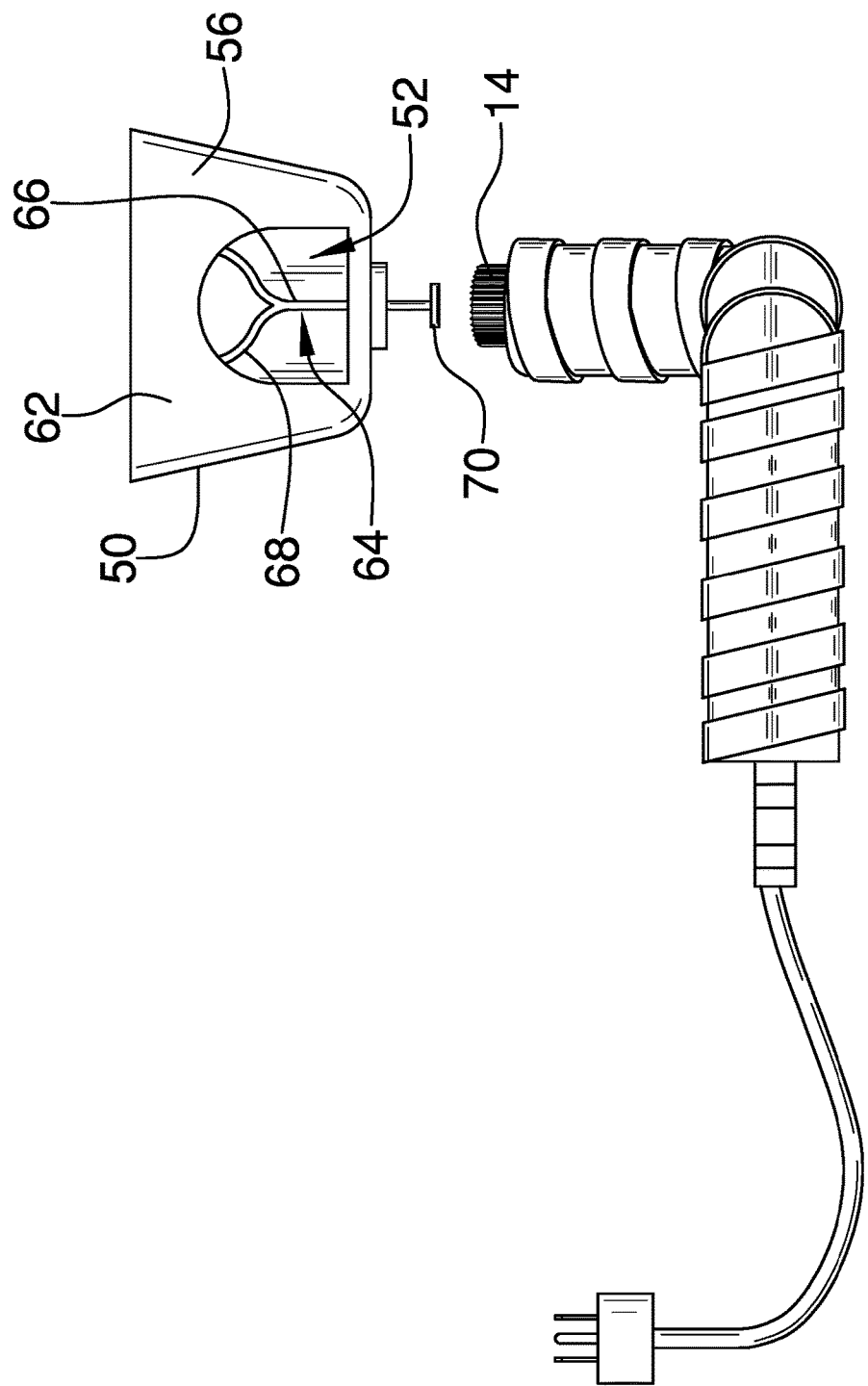
FIG. 6 is an exploded bottom view of an embodiment of the disclosure.
Figure 7:
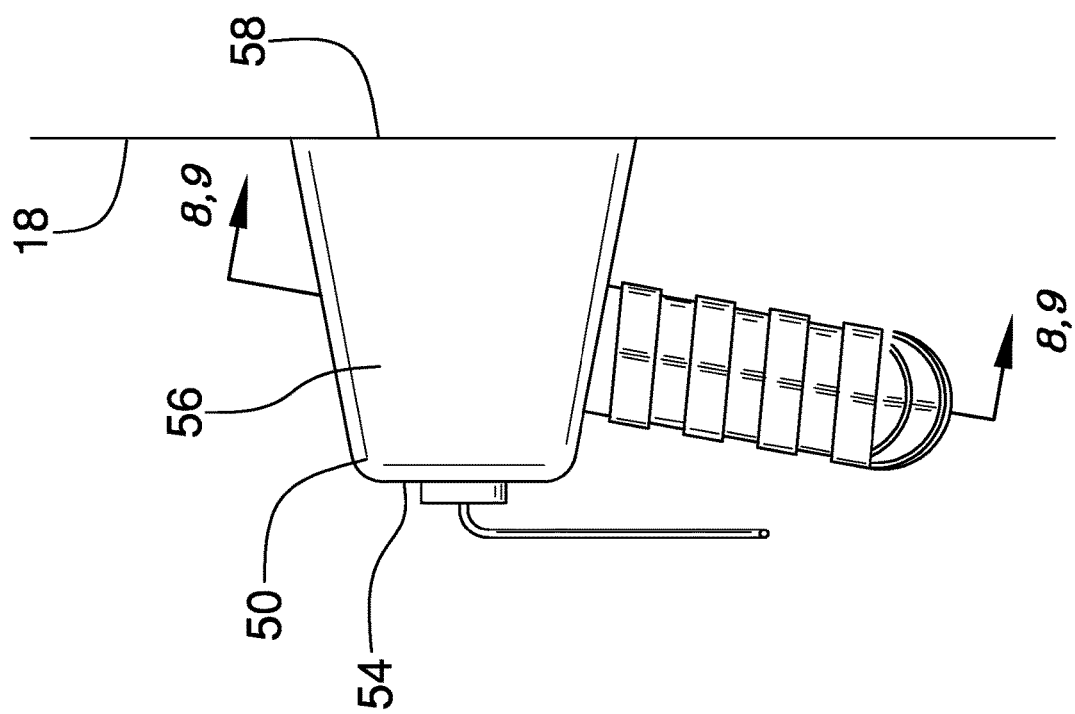
FIG. 7 is a right side view of an embodiment of the disclosure.
Figure 8:
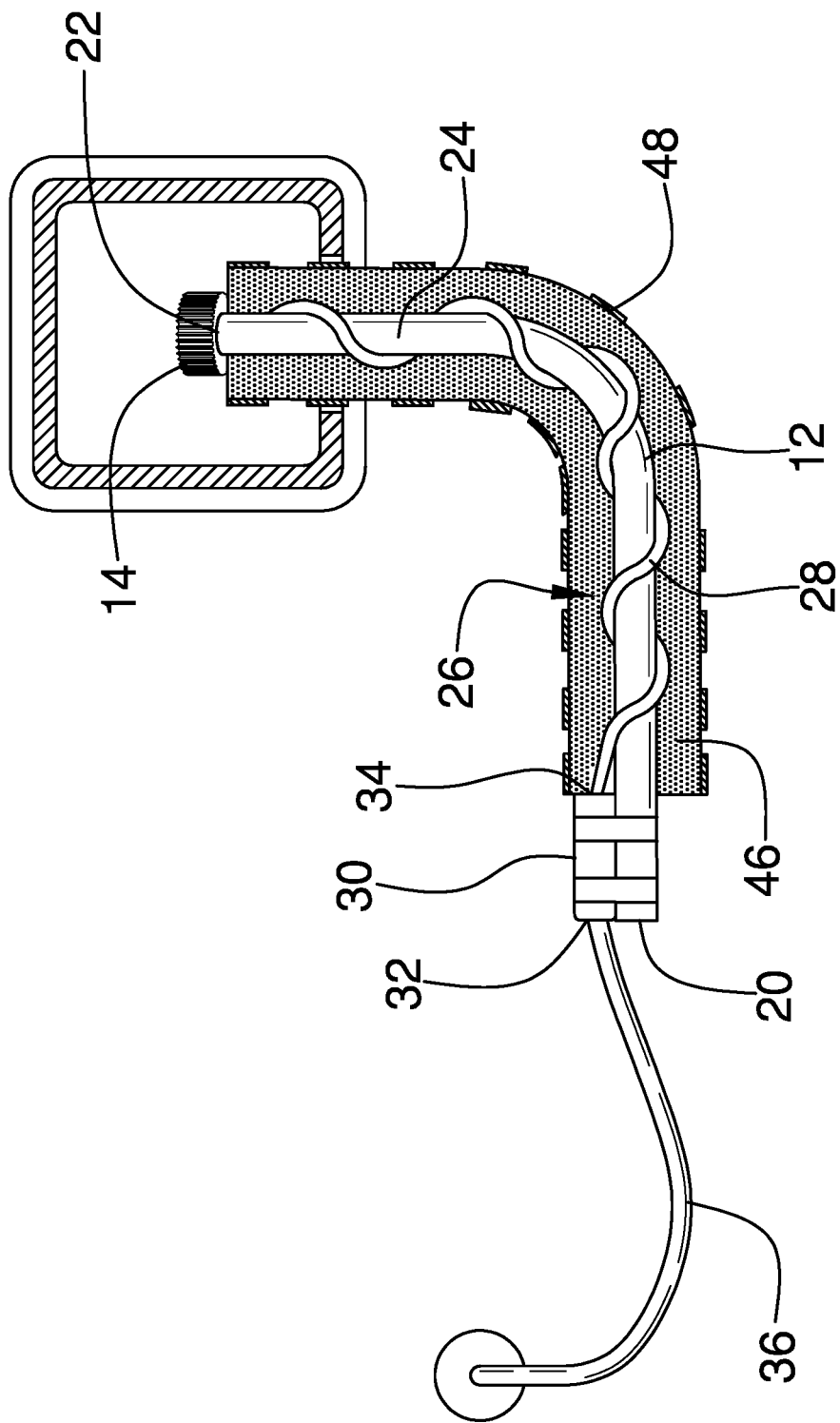
FIG. 8 is a cross sectional view taken along line 8-8 of FIG. 7 of an embodiment of the disclosure.
Figure 9:
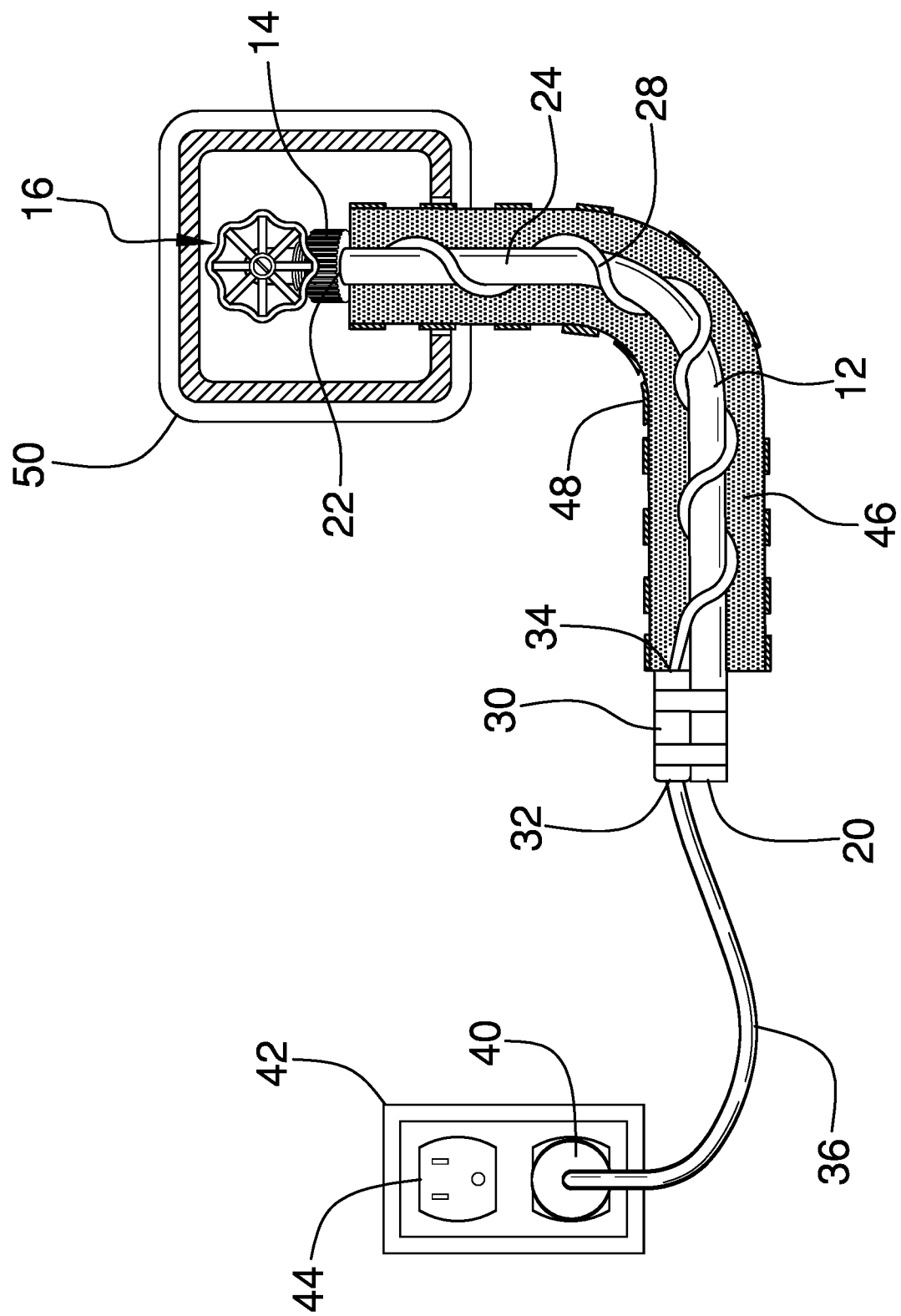
FIG. 9 is a cross sectional view taken along line 9-9 of FIG. 7 of an embodiment of the disclosure.

With reference now to the drawings, and in particular to FIGS. 1 through 9 thereof, a new winterizing device embodying the principles and concepts of an embodiment of the disclosure and generally designated by the reference numeral 10 will be described.

As best illustrated in FIGS. 1 through 9, the water pipe winterizing assembly 10 generally comprises a pipe 12 that has a female hose coupling 14 for engaging a hose bib 16 on a building 18. The pipe 12 has a first end 20, a second end 22 and an outer wall 24 extending between the first end 20 and the second end 22. The female hose coupling 14 is disposed on the second end 22 and the pipe 12 is comprised of a thermally conductive material, including but not being limited to, copper, galvanized metal, polyethylene or other material commonly associated with residential plumbing. The building 18 may be a house, for example, or other type of occupancy and the hose bib 16 may be a hose bib commonly employed for a garden hose or the like.

A heating unit 26 is provided and the heating unit 26 is attached to the pipe 12. The heating unit 26 is in thermal communication with the pipe 12 and the heating unit 26 heats the pipe 12 when the heating unit 26 is turned on. In this way the pipe 12 can heat the hose bib 16 to inhibit the hose bib 16 from freezing as well as inhibiting water pipes associated with the hose bib 16 from freezing. The heating unit 26 comprises a heating element 28 that is wrapped around the outer wall 24 of the pipe 12 such that the heating element 28 forms a coil extending between the first end 20 of the pipe 12 and the second end 22 of the pipe 12. The heating element 28 may comprise an electrical heating element with an operational temperature ranging between approximately 80.0 degrees Fahrenheit and 100.0 degrees Fahrenheit.

The heating unit 26 includes a heat sensor 30 that is attached to the outer wall 24 of the pipe 12 such that the heat sensor 30 is in thermal communication with the outer wall 24 of the pipe 12. In this way the heat sensor 30 can sense a temperature of the pipe 12. The heat sensor 30 is positioned adjacent to the first end 20 of the pipe 12, the heat sensor 30 has an input 32 and an output 34 and the heating element 28 is electrically coupled to the output 34. The heat sensor 30 actuates the heating element 28 when the heat sensor 30 senses that the temperature of the pipe 12 is below a pre-determined trigger temperature. Conversely, the heat sensor 30 de-actuates the heating element 28 when the heat sensor 30 senses that the temperature of the pipe 12 is above the pre-determined trigger temperature. The heat sensor 30 may comprise an electronic heat sensor or the like and the pre-determined trigger temperature may be a temperature of approximately 100.0 degrees Fahrenheit.

The heating unit 26 includes a power cord 36 that is electrically coupled to the input 32 of the heat sensor 30 and the power cord 36 has a distal end 38 with respect to the input 32. The power cord 36 has a male plug 40 that is electrically coupled to the distal end 38 thereby facilitating the male plug 40 to be plugged into a power source 42 comprising a female electrical outlet 44. The female electrical outlet 44 may be a component of an electrical system of the building 18 to which the hose bib 16 is attached. Furthermore, the female electrical outlet 44 may supply 120.0 volts of alternating current as is common with residential electrical circuitry in the United States or other voltage and current that are commonly employed in other countries around the world.

An insulating pad 46 is provided and the insulating pad 46 is positioned around the outer wall 24 of the pipe 12. The insulating pad 46 is comprised of a thermally insulating material thereby inhibiting thermal communication between the pipe 12 and ambient air. The insulating pad 46 extends substantially between the first end 20 and the second end 22 of the pipe 12. The insulating pad 46 may comprise a foam rubber sleeve or other type of insulating pad that would commonly be employed on plumbing for protecting water lines from the elements. A band 48 is wrapped around the insulating pad 46 for retaining the insulating pad 46 around the pipe 12 and the band 48 forms a coil extending along a full length of the insulating pad 46.

A cover 50 is provided and the cover 50 is positionable over the hose bib 16. The cover 50 has a pipe opening 52 extending through the cover 50 to facilitate the pipe 12 to be extended through the pipe opening 52. The cover 50 has a rear wall 54 and an outside wall 56 extending away from the rear wall 54, and the outside wall 56 has a distal edge 58 with respect to the rear wall 54 which defines an entry 60 into the cover 50. The outside wall 56 flares outwardly between the rear wall 54 and the distal edge 58. Furthermore, the outside wall 56 has a lower side 62 and the pipe opening 52 extends through the lower side 62.

A retainer 64 is provided which extends through the cover 50 and the retainer 64 is positionable around the hose bib 16 when the cover 50 is positioned over the hose bib 16 for retaining the cover 50 over the hose bib 16. The retainer 64 has a central portion 66 extending between a ring portion 68 and a handle portion 70. The central portion 66 extends through the rear wall 54 of the cover 50 such that the ring portion 68 is positioned in the cover 50 and the handle portion 70 is spaced from the rear wall 54 of the cover 50. The handle portion 70 is oriented transverse with the handle portion 70 thereby facilitating the handle portion 70 to be gripped. The ring portion 68 forms a closed loop thereby facilitating the ring portion 68 to be positioned around the hose bib 16. The retainer 64 includes a stopper 72 that is positioned around the central portion 66 and the stopper 72 is attached to the rear wall 54 of the cover 50 to inhibit the central portion 66 from being pulled through the rear wall 54.

In use, the cover 50 is positioned on the hose bib 16 and the ring portion 68 of the retainer 64 is positioned around the hose bib 16 to retain the cover 50 over the hose bib 16. The pipe 12 is extended through the pipe opening 52 in the cover 50 to facilitate the female hose coupling 14 to be attached to the hose bib 16. The power cord 36 is plugged into the female electrical outlet 44 thereby facilitating the heating element 28 to heat the pipe 12. In this way the pipe 12 can heat the hose bib 16 to inhibit the hose bib 16, and associated plumbing pipes behind with wall of the building 18, from freezing. Thus, the building 18 to which the hose bib 16 is attached is protected from water damage that can result from pipes having burst due to freezing during winter months. The pipe 12 and the cover 50 are removed from the hose bib 16 when winter is over thereby facilitating the hose bib 16 to be employed in the traditional convention.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A water pipe winterizing assembly for inhibiting a hose bib from freezing, said assembly comprising:

a pipe having a female hose coupling for engaging a hose bib on a building;
a heating unit being attached to said pipe, said heating unit being in thermal communication with said pipe, said heating unit heating said pipe when said heating unit is turned on thereby facilitating said pipe to heat the hose bib wherein said heating unit is configured to inhibit the hose bib and associated water pipes from freezing;
an insulating pad being positioned around said pipe, said insulating pad being comprised of a thermally insulating material thereby inhibiting thermal communication between said pipe and ambient air;
a cover being positionable over the hose bib, said cover having a pipe opening extending through said cover to facilitate said pipe to be extended through said pipe opening; and
a retainer extending through said cover, said retainer being positionable around the hose bib when said cover is positioned over the hose bib for retaining said cover over the hose bib.

2. The assembly according to claim 1, wherein:
said pipe has a first end, a second end and an outer wall extending between said first end and said second end, said female hose coupling being disposed on said second end, said pipe being comprised of a thermally conductive material;
said heating unit comprises:
a heating element being wrapped around said outer wall of said pipe such that said heating element forms a coil extending between said first end of said pipe and said second end of said pipe; and
a heat sensor being attached to said outer wall of said pipe such that said heat sensor is in thermal communication with said outer wall of said pipe thereby facilitating said heat sensor to sense a temperature of said pipe, said heat sensor being positioned adjacent to said first end of said pipe, said heat sensor having an input and an output, said heating element being electrically coupled to said output, said heat sensor actuating said heating element when said heat sensor senses that the temperature of said pipe is below a pre-determined trigger temperature, said heat sensor de-actuating said heating element when said heat sensor senses that the temperature of said pipe is above the pre-determined trigger temperature.

3. The assembly according to claim 2, wherein said heating unit includes a power cord being electrically coupled to said input of said heat sensor, said power cord having a distal end with respect to said input, said power cord having a male plug being electrically coupled to said distal end thereby facilitating said male plug to be plugged into a power source comprising a female electrical outlet.

4. The assembly according to claim 2, wherein:
said insulating pad extending substantially between said first end and said second end of said pipe; and
said assembly includes a band being wrapped around said insulating pad for retaining said insulating pad around said pipe, said band forming a coil extending along a full length of said insulating pad.

5. The assembly according to claim 1, wherein said cover has a rear wall and an outside wall extending away from said rear wall, said outside wall having a distal edge with respect to said rear wall defining an entry into said cover, said outside wall flaring outwardly between said rear wall and said distal edge, said outside wall having a lower side, said pipe opening extending through said lower side.

6. The assembly according to claim 5, wherein said retainer has a central portion extending between a ring portion and a handle portion, said central portion extending through said rear wall of said cover such that said ring portion is positioned in said cover and said handle portion is spaced from said rear wall of said cover.

7. The assembly according to claim 6, wherein said handle portion is oriented transverse with said handle portion thereby facilitating said handle portion to be gripped.

8. The assembly according to claim 6, wherein said ring portion forms a closed loop thereby facilitating said ring portion to be positioned around the hose bib.

9. The assembly according to claim 6, wherein said retainer includes a stopper being positioned around said central portion, said stopper being attached to said rear wall of said cover to inhibit said central portion from being pulled through said rear wall.

10. A water pipe winterizing assembly for inhibiting a hose bib from freezing, said assembly comprising:
a pipe having a female hose coupling for engaging a hose bib on a building, said pipe having a first end, a second end and an outer wall extending between said first end and said second end, said female hose coupling being disposed on said second end, said pipe being comprised of a thermally conductive material;
a heating unit being attached to said pipe, said heating unit being in thermal communication with said pipe, said heating unit heating said pipe when said heating unit is turned on thereby facilitating said pipe to heat the hose bib wherein said heating unit is configured to inhibit the hose bib and associated water pipes from freezing, said heating unit comprising:
a heating element being wrapped around said outer wall of said pipe such that said heating element forms a coil extending between said first end of said pipe and said second end of said pipe;
a heat sensor being attached to said outer wall of said pipe such that said heat sensor is in thermal communication with said outer wall of said pipe thereby facilitating said heat sensor to sense a temperature of said pipe, said heat sensor being positioned adjacent to said first end of said pipe, said heat sensor having an input and an output, said heating element being electrically coupled to said output, said heat sensor actuating said heating element when said heat sensor senses that the temperature of said pipe is below a pre-determined trigger temperature, said heat sensor de-actuating said heating element when said heat sensor senses that the temperature of said pipe is above the pre-determined trigger temperature; and
a power cord being electrically coupled to said input of said heat sensor, said power cord having a distal end with respect to said input, said power cord having a male plug being electrically coupled to said distal end thereby facilitating said male plug to be plugged into a power source comprising a female electrical outlet;
an insulating pad being positioned around said outer wall of said pipe, said insulating pad being comprised of a thermally insulating material thereby inhibiting thermal communication between said pipe and ambient air, said insulating pad extending substantially between said first end and said second end of said pipe;
a band being wrapped around said insulating pad for retaining said insulating pad around said pipe, said band forming a coil extending along a full length of said insulating pad;

a cover being positionable over the hose bib, said cover having a pipe opening extending through said cover to facilitate said pipe to be extended through said pipe opening, said cover having a rear wall and an outside wall extending away from said rear wall, said outside wall having a distal edge with respect to said rear wall defining an entry into said cover, said outside wall flaring outwardly between said rear wall and said distal edge, said outside wall having a lower side, said pipe opening extending through said lower side; and a retainer extending through said cover, said retainer being positionable around the hose bib when said cover is positioned over the hose bib for retaining said cover over the hose bib, said retainer having a central portion extending between a ring portion and a handle portion, said central portion extending through said rear wall of said cover such that said ring portion is positioned in said cover and said handle portion is spaced from said rear wall of said cover, said handle portion being oriented transverse with said handle portion thereby facilitating said handle portion to be gripped, said ring portion forming a closed loop thereby facilitating said ring portion to be positioned around the hose bib, said retainer including a stopper being positioned around said central portion, said stopper being attached to said rear wall of said cover to inhibit said central portion from being pulled through said rear wall.

* * * * *